United States Patent
Park et al.

(10) Patent No.: US 12,309,030 B2
(45) Date of Patent: May 20, 2025

(54) METHOD AND APPARATUS FOR RESOURCE OPTIMIZATION BETWEEN NETWORK SLICE IN 5G NR SYSTEM

(71) Applicant: Samsung Electronics Co., Ltd., Suwon-si (KR)

(72) Inventors: Youngjun Park, Suwon-si (KR); Byoungha Yi, Suwon-si (KR); Youngbo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 17/884,085

(22) Filed: Aug. 9, 2022

(65) Prior Publication Data
US 2023/0188425 A1    Jun. 15, 2023

Related U.S. Application Data

(63) Continuation of application No. PCT/KR2022/011753, filed on Aug. 8, 2022.

(30) Foreign Application Priority Data

Dec. 9, 2021   (KR) .................. 10-2021-0175516

(51) Int. Cl.
*H04L 41/0896* (2022.01)
*H04W 28/20* (2009.01)

(52) U.S. Cl.
CPC ......... *H04L 41/0896* (2013.01); *H04W 28/20* (2013.01)

(58) Field of Classification Search
CPC ........................... H04L 41/0896; H04W 28/20
(Continued)

(56) References Cited

U.S. PATENT DOCUMENTS 11,044,777 B2   6/2021   Hong et al.
11,589,401 B2   2/2023   Yang et al.
(Continued)

FOREIGN PATENT DOCUMENTS

KR          10-2133255 B1    7/2020
KR     10-2021-0104902 A     8/2021
(Continued)

OTHER PUBLICATIONS

China Mobile, Support of slice priority and slice group information for cell (re)selection, SA WG2 Meeting #S2-148E, Electronic, S2-2108798, Nov. 15-22, 2021.
(Continued)

*Primary Examiner* — Nicholas R Taylor
*Assistant Examiner* — Chong G Kim
(74) *Attorney, Agent, or Firm* — Jefferson IP Law, LLP

(57) ABSTRACT

The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. A method for dynamically allocating a resource to a network slice in a wireless communication system is provided.

19 Claims, 6 Drawing Sheets

(58) Field of Classification Search
USPC .......................................................... 370/229
See application file for complete search history.

(56) References Cited

U.S. PATENT DOCUMENTS

| | | | |
|---|---|---|---|
| 11,785,633 B2 | 10/2023 | Xing | |
| 2018/0152958 A1* | 5/2018 | Arnold | H04L 41/5009 |
| 2018/0317134 A1 | 11/2018 | Leroux et al. | |
| 2019/0182752 A1* | 6/2019 | Lou | H04W 28/0289 |
| 2019/0261187 A1 | 8/2019 | Chen et al. | |
| 2020/0170052 A1* | 5/2020 | Yang | H04W 28/26 |
| 2020/0196155 A1* | 6/2020 | Bogineni | H04W 28/082 |
| 2020/0296615 A1 | 9/2020 | Yang et al. | |
| 2021/0153066 A1* | 5/2021 | Guha | H04L 47/805 |
| 2021/0160153 A1 | 5/2021 | Akman et al. | |
| 2021/0211942 A1 | 7/2021 | Guo et al. | |
| 2021/0337553 A1* | 10/2021 | Chong | H04L 41/5019 |
| 2021/0368514 A1* | 11/2021 | Xing | H04L 41/0895 |
| 2022/0225334 A1* | 7/2022 | Xu | H04W 24/08 |
| 2023/0246900 A1* | 8/2023 | Zhang | H04L 41/342 709/223 |

FOREIGN PATENT DOCUMENTS

| | | |
|---|---|---|
| KR | 10-2657312 B1 | 4/2024 |
| WO | 2020/061314 A1 | 3/2020 |

OTHER PUBLICATIONS

Huawei et al., Clarify the resource usage for a network slice instance, 3GPP TSG-WG SA2 Meeting #148E e-meeting, S2-2109084, Elbonia, Nov. 15-19, 2021.
China Telecom, Clarification on input and output of slice load level analytics, 3GPP TSG-WG SA2 Meeting #148E e-meeting, S2-2108425, Elbonia, Nov. 15-19, 2021.
International Search Report and Written Opinion dated Nov. 23, 2022, issued in International Application No. PCT/KR2022/011753.
European Search Report dated Feb. 7, 2025, issued in European Application No. 22904384.9.

* cited by examiner

METHOD AND APPARATUS FOR RESOURCE OPTIMIZATION BETWEEN NETWORK SLICE IN 5G NR SYSTEM

CROSS-REFERENCE TO RELATED APPLICATION(S)

This application is a continuation application, claiming priority under § 365(c), of an International application No. PCT/KR2022/011753, filed on Aug. 8, 2022, which is based on and claims the benefit of a Korean patent application number 10-2021-0175516, filed on Dec. 9, 2021, in the Korean Intellectual Property Office, the disclosure of which is incorporated by reference herein in its entirety.

TECHNICAL FIELD

The disclosure relates to a method and an apparatus for optimizing radio resources between network slices in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (millimeter wave (mmWave)) bands (e.g., 60 gigahertz (GHz) bands) so as to accomplish higher data rates. To decrease propagation loss of the radio waves and increase the transmission distance in the ultrahigh frequency bands, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include an ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method wherein, even when a business operator provides basic information of a network slice, the network slice is automatically configured in a base station.

Another aspect of the disclosure is to provide a method wherein, based on configured information, a base station dynamically adjusts radio resources of respective network slices.

Another aspect of the disclosure is to provide a method wherein two or more network slices contend and use shared radio resources according to a priority.

Another aspect of the disclosure is to provide a method for optimally determining the amount of radio resources used in network slices.

Additional aspects will be set forth in part in the description which follows and, in part, will be apparent from the description, or may be learned by practice of the presented embodiments.

Technical Solution

In accordance with an aspect of the disclosure, a method performed by a base station in a wireless communication system is provided. The method includes receiving a first message including information on a throughput requirement regarding at least one network slice from a self-organization network (SON) manager, adjusting a resource value regarding the first network slice by a preconfigured value, at a preconfigured period, based on information on a throughput of at least one terminal regarding a first network slice of the at least one network slice and information on a throughput requirement regarding the first network slice, and transmitting a second message including information on the resource value adjustment result to the SON manger.

In addition, the adjusting the resource value regarding the first network slice may include determining whether the throughput of the at least one terminal regarding the first network slice is smaller than the throughput requirement regarding the first network slice, when the throughput of the at least one terminal regarding the first network slice is smaller than the throughput requirement regarding the first network slice, determining whether the maximum resource rate regarding the first network slice is greater than or equal to a preconfigured maximum value, when the maximum resource rate regarding the first network slice is not greater than or equal to the preconfigured maximum value, increasing the maximum resource rate regarding the first network slice by a preconfigured value, and when the maximum resource rate regarding the first network slice is greater than or equal to the preconfigured maximum value, maintaining the maximum resource rate regarding the first network slice and adding the number of times the maximum resource rate regarding the first network slice has been maintained to the information on the resource value adjustment result.

In addition, the adjusting the resource value regarding the first network slice may include determining whether the throughput of the at least one terminal regarding the first network slice is greater than the throughput requirement regarding the first network slice, when the throughput of the at least one terminal regarding the first network slice is greater than the throughput requirement regarding the first network slice, determining whether the maximum resource rate regarding the first network slice is smaller than or equal to a preconfigured minimum value, when the maximum resource rate regarding the first network slice is not smaller than or equal to the preconfigured minimum value, reducing the maximum resource rate regarding the first network slice by a preconfigured value, and when the maximum resource rate regarding the first network slice is smaller than or equal to the preconfigured minimum value, maintaining the maximum resource rate regarding the first network slice and adding the number of times the maximum resource rate regarding the first network slice has been maintained to the information on the resource value adjustment result.

In addition, the adjusting the resource value regarding the first network slice may include when the maximum resource rate regarding the first network is smaller than or equal to a preconfigured minimum value, or the maximum resource rate regarding the first network is greater than or equal to a preconfigured maximum value, maintaining the maximum resource rate regarding the first network slice, and adding the number of times the maximum resource rate regarding the first network slice has been maintained in the information on the resource value adjustment result.

In addition, the method may further include receiving, from the SON manager, a third message including a priority value regarding the first network slice, which is determined based on the information on the resource value adjustment result, and adjusting the resource value regarding the first network slice based on the priority value regarding the first network slice.

In addition, the method may further include when the number of times the resource value regarding the first network slice has been adjusted is greater than a preconfigured value, increasing the preconfigured value, and when the number of times the resource value regarding the first network slice has been adjusted is smaller than a preconfigured value, reducing the preconfigured value.

In accordance with another aspect of the disclosure, a method performed by a SON manager of a communication system is provided. The method includes receiving information on at least one network slice from a service provider, determining a throughput requirement regarding the at least one network slice based on the information on the at least one network slice, transmitting a first message including information on the throughput requirement regarding the at least one network slice to a base station, and receiving, from the base station, a second message including information on a resource value adjustment result regarding the at least one network slice, which is adjusted based on the information on the throughput requirement regarding the at least one network slice and information on a throughput of at least one terminal regarding the at least one network slice.

In addition, the method may further include configuring a priority regarding the at least one network slice, based on the information on the resource value adjustment result regarding the at least one network slice, and transmitting a third message including information on the priority regarding the at least one network slice to the base station.

In accordance with another aspect of the disclosure, a base station of a communication system is provided. The base station includes a transceiver, and a controller connected to the transceiver and configured to receive a first message including information on a throughput requirement regarding at least one network slice from a self-organization network (SON) manager, and adjust a resource value regarding the first network slice by a preconfigured value, at a preconfigured period, based on information on a throughput of at least one terminal regarding a first network slice of the at least one network slice and information on a throughput requirement regarding the first network slice.

In accordance with another aspect of the disclosure, an SON manager of a communication system is provided. The SON manager includes a transceiver, and a controller connected to the transceiver and configured to receive information on at least one network slice from a service provider, determine a throughput requirement regarding the at least one network slice based on the information on the at least one network slice, transmit a first message including information on the throughput requirement regarding the at least one network slice to a base station, and receive, from the base station, a second message including information on a resource value adjustment result regarding the at least one network slice, which is adjusted based on the information on the throughput requirement regarding the at least one network slice and information on a throughput of at least one terminal regarding the at least one network slice.

Advantageous Effects

An embodiment of the disclosure may provide a method wherein, even when a business operator provides basic information of a network slice, the network slice is automatically configured in a base station.

Another embodiment of the disclosure may provide a method wherein, based on configured information, a base station dynamically adjusts radio resources of respective network slices.

Another embodiment of the disclosure may provide a method wherein two or more network slices contend and use shared radio resources according to a priority.

Another embodiment of the disclosure may provide a method for optimally determining the amount of radio resources used in network slices.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
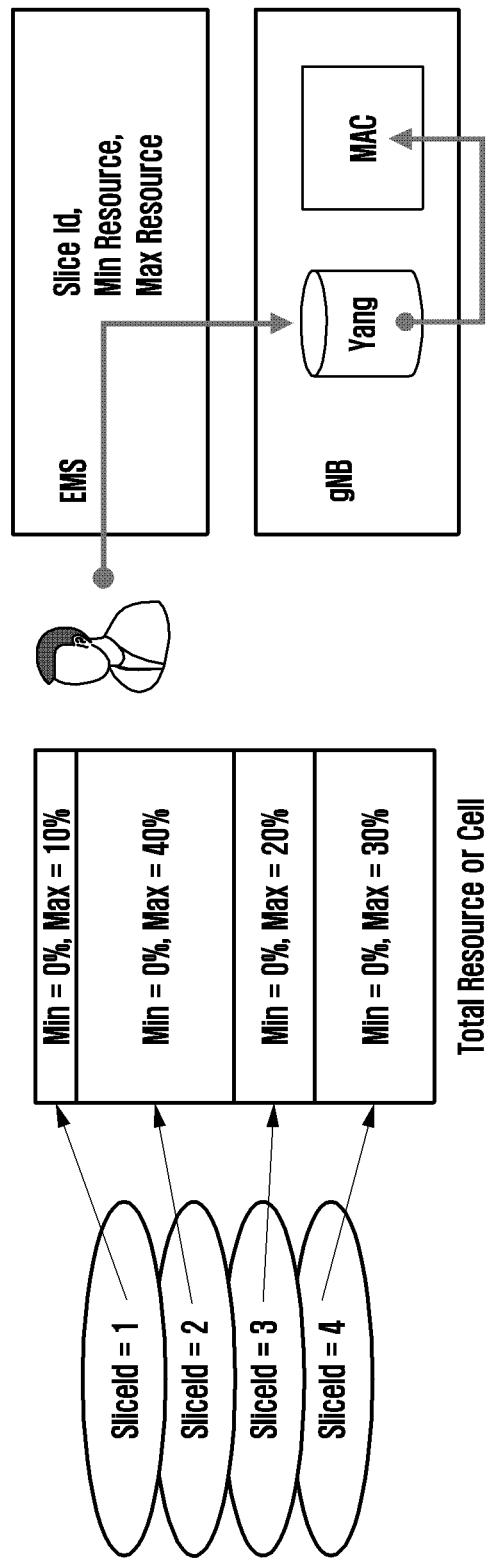
FIG. 1 is a view illustrating an example of a method for allocating a resource regarding a network slice according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification (ID) information, and the like are illustratively used for the sake of convenience. Therefore, the disclosure is not limited by the terms as used below, and other terms referring to subjects having equivalent technical meanings may be used.

A 5G mobile communication network is composed of a 5G user equipment (UE) (or terminal), a 5G radio access network (RAN), a base station, a next generation node B (gNB) (5G node B), an evolved node B (eNB) and the like, and a 5G core network. The 5G core network is composed of network functions such as access and mobility management function (AMF) configured to provide a mobility management function of a UE, a session management function (SMF) configured to provide a session management function, a user plane function (UPF) configured to serve to transfer data, a policy control function (PCF) configured to provide a policy control function, a unified data management (UDM) configured to provide a data management function such as subscriber data and policy control data, a unified data repository (UDR) configured to store data of various network functions such as UDM.

A network slicing technology in a 5G system indicates a technology and structure to allow virtualized, independent, multiple logical networks in one physical network. A network service provider may provide a service by configuring a virtual end-to-end network called a network slice in order to satisfy a service/application-specific requirement. The network slice is distinguished by an identifier called single-network slice selection assistance information (S-NSSAI). A network may transmit a slice set (e.g., allowed NSSAI(s)) allowed to a UE during a UE registration procedure, and the UE may transmit/receive application data through a protocol data unit (PDU) generated through one S-NSSAI (i.e., a network slice) in the slice set.

The disclosure relates to a self-organization network (SON) in the 5G new radio (NR) system, and relates to a management technology configured to operate a network slice of a 5G standalone (SA) base station system.

A mobile communication service provider may use a network slice technology to provide a differentiated service and apply a corresponding charge to a subscriber. Subscribers included in a specific network slice may receive a similar level of data throughput and to ensure this, a service provider may allocate radio resources with appropriate size for each network slice. Described in the disclosure is a method for automatically configuring a network slice by a base station to provide a data throughput to a terminal and dynamically and competitively optimizing a radio resource used in a network slice.

FIG. 1 is a view illustrating an example of a method for allocating a resource regarding a network slice according to the related art.

Referring to FIG. 1, when a mobile communication service provider configures a network slice, each network slice may occupy a radio resource not overlapping with other network slices and try to satisfy the service level agreement (SLA) for a network slice. To this end, the service provider may allocate a dedicated radio resource to a base station (a radio access network (RAN), gNB) for each network slice. The service provider may determine a size of a radio resource for satisfying the SLA by means of experience and prediction and manually configure a radio resource to the base station (e.g., an RAN) for each network slice.

The service provider may determine an amount of resources for each network slice out of 100% of all radio resources, for example, when there are four network slices, the service provider may determine an amount of resources exclusively used by network slice 1 to network slice 4 out of all the radio resources. For example, a maximum of 10% of radio resources may be configured in network slice 1, a maximum of 40% of radio resources may be configured in network slice 2, a maximum of 20% of radio resources may be configured in network slice 3, and a maximum of 30% of radio resources may be configured in network slice 4.

The service provider may store the radio resource configuration regarding the network slice on a database named "Yang" of a gNB and a scheduler included in a medium access control (MAC) of a gNB may obtain the radio resource configuration from the Yang database and reflect the radio resource configuration when traffic of a subscriber is scheduled.

However, a conventional technology may have a problem that a service provider needs to directly determine and configure a radio resource of a network slice required to satisfy the SLA. This process may take time and cost for the service provider.

Furthermore, a conventional technology may have a problem that a radio resource is fixedly used for each network slice. Therefore, when the number of subscribers (terminals and users) included in a network slice is increased or reduced, or traffic of subscribers is increased or reduced, a radio resource amount is unable to adaptively change and thus there is no choice but to set the radio resource to the maximum. According thereto, radio resource use efficiency of the base station may be reduced.

In this connection, an embodiment of the disclosure suggests a method in which a network slice is automatically configured to an RAN even if a service provider provides only basic information of the network slice.

In addition, an embodiment of the disclosure suggests a method for dynamically adjusting a radio resource of each network slice in an RAN based on the configured information.

In addition, an embodiment of the disclosure suggests a method in which two or more network slices compete for a shared resource through priority and use the shared resource.

In addition, an embodiment of the disclosure suggests a method for determining an amount of a radio resource used in a network slice optimally.

For example, in the embodiment of FIG. 1, the resources allocated to network slice 1 to network slice 4 may be changed over time. By way of example, after a predetermined time elapses, the number of terminals (users) included in each network slice may be changed or traffic of terminals may be changed. For example, the number of terminals included in network slice 1 may increase and the number of terminals allocated to network slice 4 may be reduced. Alternatively, an amount of traffic of terminals included in network slice 1 may increase and an amount of traffic of terminals allocated to network slice 4 may be reduced. In this case, a resource allocated to network slice 1 may be changed to 20% of the total resources. A resource allocated to network slice 2 may be changed to 40% of the total resources, a resource allocated to network slice 3 may be changed to 20% of the total resources, and a resource allocated to network slice 4 may be changed to 20% of the total resources. After a predetermined time elapses, the number of terminals included in network slice 1 may continuously increase and the number of terminals allocated to network slice 4 may be continuously reduced. Alternatively, an amount of traffic of terminals included in network slice 1 may continuously increase and an amount of traffic of terminals allocated to network slice 4 may be continuously reduced. Here, a resource allocated to network slice 1 may be changed to 30% of the total resources, a resource allocated to network slice 2 may be changed to 40% of the total resources, a resource allocated to network slice 3 may be changed to 20% of the total resources, and a resource allocated to network slice 4 may be changed to 10% of the total resources.

Figure 2:
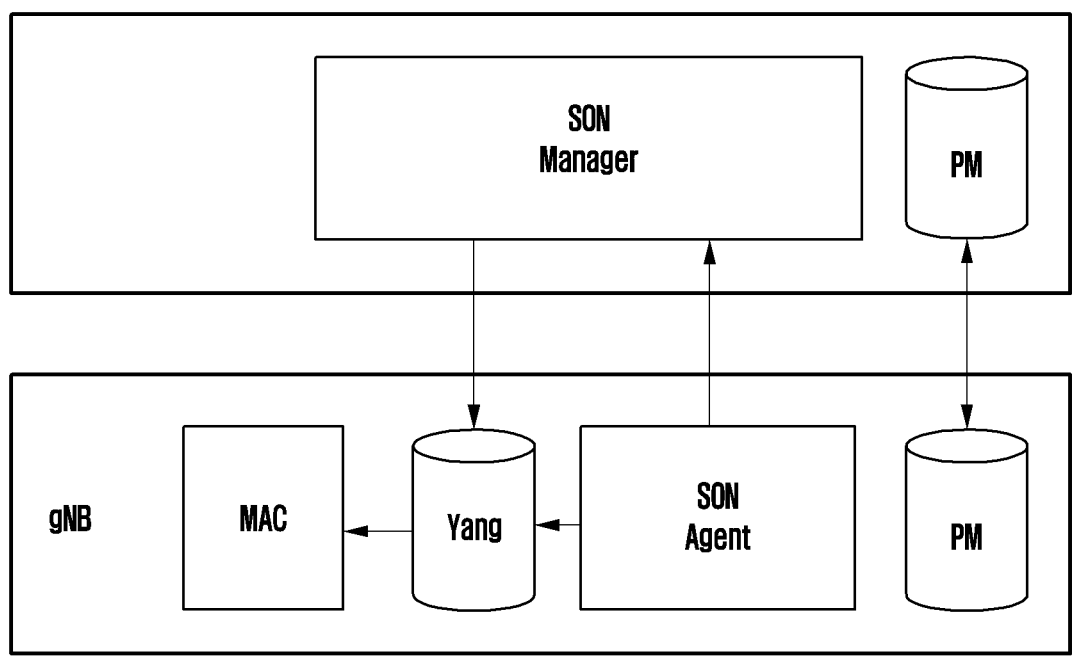
FIG. 2 is a view illustrating operations of an SON manager and an SON agent according to an embodiment of the disclosure.

FIG. 2 is a view illustrating operations of an SON manager and an SON agent according to an embodiment of the disclosure.

Referring to FIG. 2, a SON manager may be implemented as an independent server form inside or outside the gNB, and may operate inside an element manger (EMS), a network slice manager (NSM), a radio information controller (RIC), and the like. The SON agent operates inside the gNB.

A performance management (PM) database may store performance statistic data of the gNB. A PM referred to by the SON manager and a PM referred to by the SON agent may maintain the same information through synchronization. According to an embodiment, the PM referred to by the SON manager and the PM referred to by the SON agent may exist as separate databases or may exist as the same database. In addition, the PM may be a separate database outside the gNB or a database inside the gNB.

When transferring information to the SON agent, the SON manager may configure information on a network slice on the Yang database of the gNB. The SON agent may obtain the information by periodically inquiring the Yang database.

When transferring information to the SON manager, the SON agent may configure information on a network slice on the Yang database of the gNB. The SON manager may obtain the information by periodically inquiring the Yang database. The SON manager may manage multiple SON agents, and thus the SON agent may directly transfer an additional message to the SON manager if necessary.

The SON manager may obtain network slice information from an operator (e.g., a service provider). The SON manager may select a target cell in which a network slice needs to be generated, and may automatically generate additional information if necessary to configure the additional information to a base station (e.g., an SON agent). The SON manager may adjust operations between network slices. The SON manager may analyze a state of an operating network slice and adjust the SLA. The SON manager may adjust a priority regarding network slices in a cell.

The SON agent may automatically adjust a resource of a network slice. For example, the SON agent may periodically determine a minimum/maximum resource value. In addition, the SON agent may perform detailed adjustment for minimization of a minimum/maximum resource. For example, an increase/decrease rate of the minimum/maximum resource may be adjusted.

Figure 3:
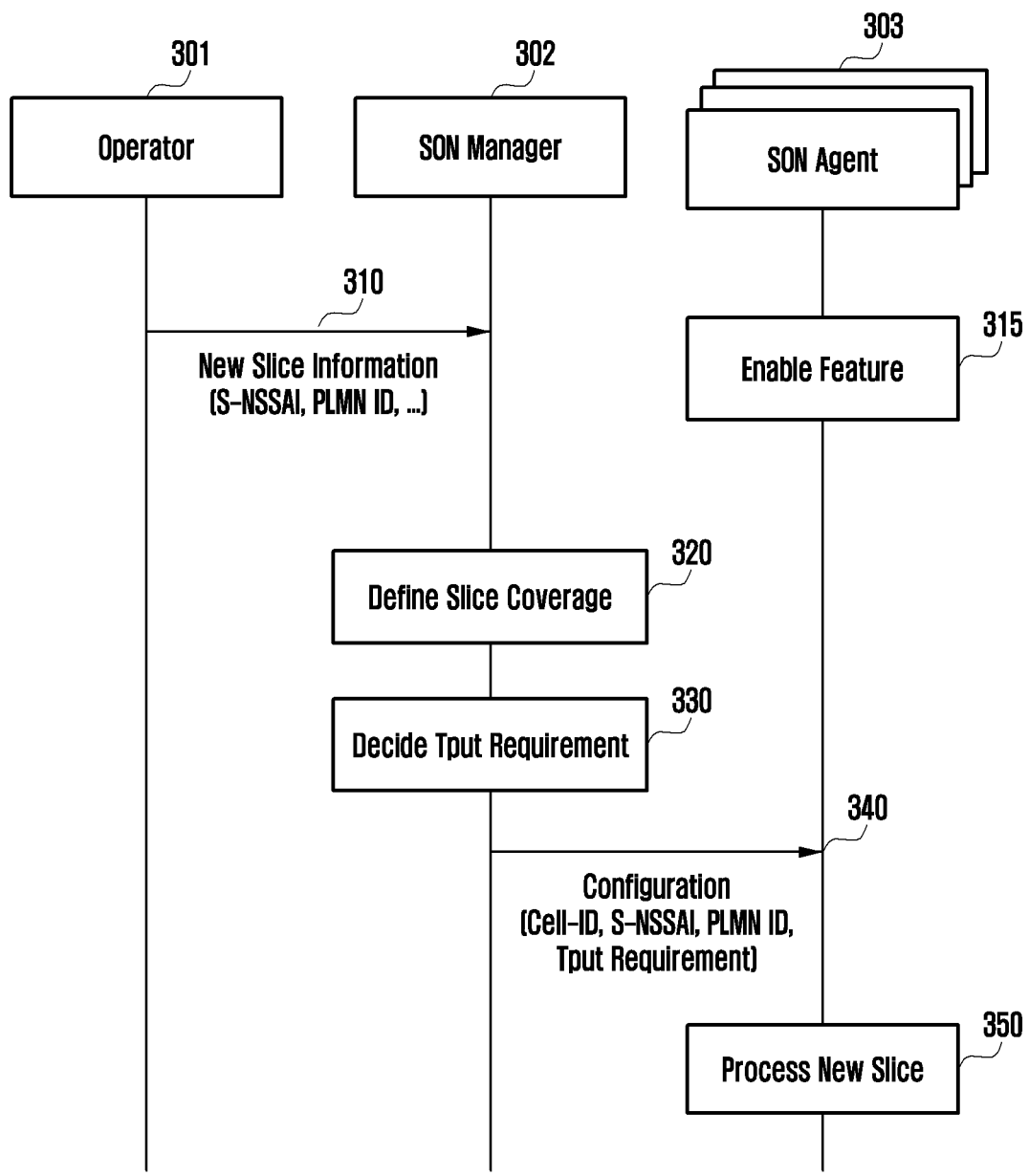
FIG. 3 is a view illustrating an example of a method for configuring network slice information according to an embodiment of the disclosure.

FIG. 3 is a view illustrating an example of a method for configuring network slice information according to an embodiment of the disclosure.

Referring to FIG. 3, when a new network slice is generated, a service provider (e.g., operator) 301 may input information of the network slice to the SON manager, in operation 310. According to an embodiment, it may be implemented that the service provider 301 directly inputs information to the SON manager or the information is automatically transferred to the SON manager through an NSM. Slice identification information (e.g., single network slice selection assistance information (S-NSSAI)) and public land mobile network (PLMN) ID information of a new slice may be mandatory information that must be input. In addition, the service provider 301 may additionally input, as optional information, a tracking area code list and a cell list of cells in which the new network slice is configured, a requirement of a slice (e.g., a throughput requirement (SLA)), and the like.

If, in operation 310, the cell list is not input from the service provider 301, an SON manager 302 may assume that a network slice is generated in all cells having the input PLMN ID and tracking area code (TAC). If, in operation 310, the TAC list is not input from the service provider 301, the SON manager 302 may assume that a network slice is generated in all cells having the input PLMN ID and a cell including all TACs involving the SON manager 302. The SON manager 302 may configure a cell list with a group of cells determined based on received information in operation 310.

In operation 315, an SON agent (e.g., a gNB and a base station) 303 may be in a state in which a feature is activated.

In operation 320, the SON manager 302 may calculate an average value of distances (e.g., inter-sector distances (ISDs)) between cells included in the cell list having been configured by the SON manager 302, based on the cell list input by the service provider 301 in operation 310 or the information received in operation 310. The SON manager 302 may first calculate an average of distances between macro cells among cells in the cell list. The average may be referred to as ISD_MACRO. According to an embodiment, the SON manager 302 may not separately calculate distances between indoor hot spot cells among cells in the cell list, and may consider the distances to be 20 m (ISD_HOTSPOT=20m). The distance ISD_SLICE between cells included in the cell list may be calculated as in Equation 1 below.

ISD_SLICE={(ISD_MACRO*number of macro cells)+(ISD_HOTSPOT*indoor hot spot cell)}/ (total number of cells in cell list)   Equation 1

The SON manager 302 may determine an installation environment of the new network slice according to a size of ISD_SLICE.

For example, an installation environment of the new network slice may be determined according to a size of ISD_SLICE as below:

If ISD_SLICE<50 m, indoor hotspot.
If 50 m<=ISD_SLICE<200 m, dense urban.
If 200 m<=ISD_SLICE<500 m, urban macro.
If 500 m<=ISD_SLICE, rural macro.

In operation 330, the SON manager 302 may determine a throughput requirement of the network slice according to the determined installation environment. For example, the SON manager 302 may determine the throughput requirement of the network slice according to the determined installation environment with reference to Table 1 below which is defined in third generation partnership project (3GPP) TS 22.261, and may select the throughput (Tput) requirement as a throughput requirement (SLA) of the corresponding network slice.

TABLE 1

| Scenario | UE Tput Requirement (DL) | UE Tput Requirement (UL) |
|---|---|---|
| Urban macro | 50 Mbit/s | 25 Mbit/s |
| Rural macro | 50 Mbit/s | 25 Mbit/s |
| Indoor hotspot | 1 Gbit/s | 500 Mbit/s |
| Dense urban | 300 Mbit/s | 50 Mbit/s |

In operation 340, the SON manager 302 may transfer slice configuration information including the throughput requirement to the base station (e.g., the SON agent 303). The base station may include the SON agent 303. According to an embodiment, the SON manager 302 may include S-NSSAI, PLMN ID information, and the like to the slice configuration information and transfer the slice configuration information to the SON agent 303. According to an embodiment, the SON manager 302 may configure the slice configuration information to the Yang database of a cell included in the cell list. Here, a priority of the new network slice may be set to zero which is a lowest value. Alternatively, according to an embodiment, a priority value of the new network slice may be included in the slice configuration information to be transferred, and when a priority value is not included in the slice configuration information, it may be assumed that the priority value is set to zero. In operation 350, the SON agent 303 may periodically adjust an amount of a radio resource regarding the new network slice by using configured information.

Figure 4:
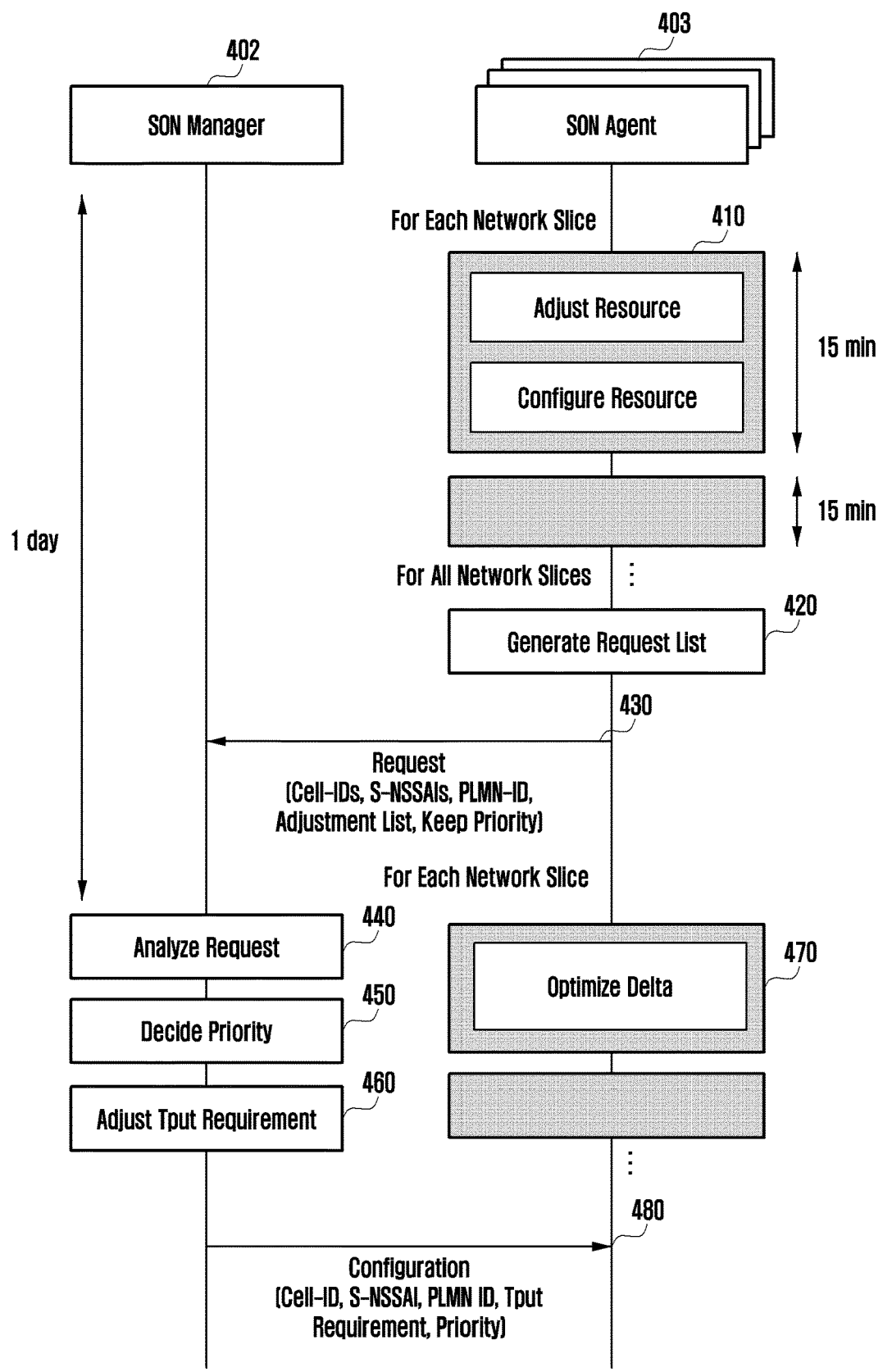
FIG. 4 is a view illustrating an example of a method for automatically adjusting a radio resource of a network slice according to an embodiment of the disclosure.

FIG. 4 is a view illustrating an example of a method for automatically adjusting a radio resource of a network slice according to an embodiment of the disclosure.

An example of parameters required for explanation of automatic adjustment of a network slice radio resource of the disclosure is as Table 2 below, and FIG. 4 will be described with reference thereto.

TABLE 2

| Parameter | Description |
|---|---|
| T_COL | Performance statistic collection period (minute) of gNB |
| TPUT_TH | Threshold value for determining whether SLA is satisfied |
| DELTA_TH1, DELTA_TH2 | Threshold value for determining whether DELTA is optimized |
| KP_TH | Threshold value for determining radio resource usage rate |
| DELTA1(Slice) | Max Resource increase of each network slice |
| DELTA2(Slice) | Max Resource decrease of each network slice |

TABLE 2-continued

| Parameter | Description |
| --- | --- |
| DELTA3(Slice) | Increase/decrease rate of throughput requirement of each network slice |
| UE_TPUT(Slice) | Statistic of average IP throughput (Mbps) for each subscriber during T_COL of each network slice |
| ACTIVE_UE(Slice) | Statistic of average number of subscribers (persons) sending traffic during T_COL of each network slice |
| MAX_UE(Slice) | Statistic of maximum number of subscribers (persons) sending traffic during T_COL of each network slice |
| N | Number of network slices installed in cell managed by SON agent |

Referring to Table 2 and FIG. 4, in operation 410, the MAC block of the gNB (e.g., SON agent 403) may periodically collect a performance statistic value at every preconfigured period. For example, the preconfigured period may be T_COL, may be a value preconfigured to the gNB (e.g., SON agent 403) in advance, and may be a value configured to the gNB (e.g., SON agent 403) by a system. The collecting of the performance statics value may be performed by the SON agent 403 of the gNB. In the embodiment of FIG. 4, it is configured that T_COL=15 min. The SON agent 403 of the gNB may collect an average throughput (UE_TPUT) for each subscriber (terminal and UE) during T_COL of each network slice regarding N number of network slices at every T_COL. The SON agent 403 may compare the collected UE_TPUT with a throughput requirement which is the SLA configured by an SON manager 402. The throughput requirement may be configured to the SON agent 403 by the SON manager 402 according to the method described in the embodiment shown in FIG. 3. The SON agent 403 may perform following operations according to a result of the comparison between the UE_TPUT and the throughput requirement.

Among N number of network slices, a networking slice having a higher priority may be performed first and a network slice having a lower priority may be performed later.

When UE_TPUT of a specific network slice is greater than a threshold value compared to the throughput requirement, for example, UE_TPUT>(throughput requirement*TPUT_TH) is satisfied, the SON agent 403 may determine that the corresponding network slice overly satisfies the SLA.

In this case, the SON agent 403 may adjust the maximum resource allocation amount (max resource) of the corresponding network slice to be reduced.

If the current max resource of the corresponding network slice has a minimum value and thus may not be reduced any more, the SON agent 403 may maintain the max resource and min resource. The SON agent 403 may add a value of {UE_TPUT−(throughput requirement*TPUT_TH)} to an adjustment request.

max resource=max resource
min resource=min resource

If the current max resource of the corresponding network slice does not have a minimum value, SON agent 403 may reduce the max resource by a preconfigured value (e.g., DELTA2). The SON agent 403 may determine the min resource by correcting the max resource with the number of actual users.

max resource=max resource−DELTA2
min resource=max resource*(AVERAGE_UE/MAX_UE)

When UE_TPUT of a specific network slice is greater than or equal to the throughput requirement and smaller than a threshold value, for example, throughput requirement<=UE_TPUT<(throughput requirement*TPUT_TH), the SON agent 403 may determine that the corresponding network slice appropriately satisfies the SLA. Therefore, the max resource and the min resource may be maintained.

max resource=max resource
min resource=min resource

When UE_TPUT of a specific network slice is smaller than the throughput requirement, for example, UE_TPUT<(throughput requirement), the SON agent 403 may determine that the corresponding network slice does not satisfy the SLA.

In this case, the SON agent 403 may adjust the maximum resource allocation amount (max resource) of the corresponding network slice to be increased.

For this end, the SON agent 403 may identify a radio resource usage rate of a current corresponding network slice.

When the radio resource usage rate of the current corresponding network slice is smaller than a threshold value of a maximum amount of allocable resources, for example, (radio resource usage rate)<(max resource*KP_TH), the SON agent 403 may determine that the SLA is not satisfied even if the max resource is increased. The SON agent 403 may maintain the max resource and min resource. The SON agent 403 may configure a keep priority flag of the corresponding network slice to be in an on-state.

max resource=max resource
min resource=min resource

When the radio resource usage rate of the current corresponding network slice is greater than or equal to a threshold value of a maximum amount of allocable resources, for example, (radio resource usage rate)>=(max resource*KP_TH) and a current max resource has a maximum value, the SON agent 403 may maintain the max resource and min resource. The SON agent 403 may add a value of (UE_TPUT−throughput requirement) to an adjustment request.

max resource=max resource
min resource=min resource

When the radio resource usage rate of the current corresponding network slice is greater than or equal to a threshold value of a maximum amount of allocable resources, for example, (radio resource usage rate)>=(max resource*KP_TH) and a current max resource is not a maximum value, the SON agent 403 may increase the max resource by preconfigured value (e.g., DELTA1). The SON agent 403 may determine the min resource by correcting the max resource with the number of actual users.

max resource=max resource+DELTA1
min resource=max resource*(AVERAGE_UE/MAX_UE)

The SON agent 403 may configured the determined max resource and min resource value to the Yang database of the gNB so as to be referred to by the MAC scheduler.

The SON agent 403 may repeatedly perform operation 410 with respect all N number of network slices at every T_COL time. In operation 420, the SON agent 403 may generate a request list at predetermined time. For example, the SON agent 403 may generate a request list when one day has elapsed.

A request may be composed of a maximum of (1440/T_COL) number of adjustment requests per network slice. For example, an adjustment request included in a request of each network slice may include information that is configured to be 1 (or 0) when a resource is not successfully increased or reduced at every T_COL and to be 0 (or 1) when a resource is successfully increased or reduced or there is no need to be increased or reduced. The adjustment request may include a value of (UE_TPUT−throughput requirement) of a period in which a resource may not be increased or a value of {UE_TPUT−(throughput requirement*TPUT_TH)} of a period in which a resource may not be reduced for each T_COL period. For example, when T_COL=15 min, a maximum of 96 adjustment requests per network slice may be included in a request and the request list may include a maximum of N number of requests.

In operation 430, the SON agent 403 may transfer a message including the request list to the SON manager 402. The message may further include at least one of cell information (e.g., cell ID(s)), slice information (e.g., S-NSSAI(s)), PLMN ID(s), priority information (e.g., keep priority flag(s)).

In operation 470, the SON agent 403 may separately calculate a sum of the number of times the max resource is increased and a sum of the number of times the min resource is reduced regarding each network slice during a preconfigured time. According to an embodiment, the preconfigured time may be a day (24 hours), two hours, or the like. The preconfigured time may be a value configured to the base station or a value configured to the base station by a network. Hereinafter, for convenience of explanation, it will be described that the preconfigured time is one day.

The SON agent 403 may correct the max resource increase amount (e.g., DELTA1) as follows.

When the sum of the number of times the max resource is increased during the predetermined time is greater than a preconfigured threshold value, for example, (sum of number of times max resource is increased for one day)>DELTA_TH1, the SON agent 403 may determine that the max resource changes too slowly. The SON agent 403 may increase a size of DELTA1. The increase value of DELTA1 may be a preconfigured value.

When the sum of the number of times the max resource is increased during the predetermined time is smaller than a preconfigured threshold value, for example, (sum of number of times max resource is increased for one day)<DELTA_TH2, the SON agent 403 may determine that the max resource changes too fast. The SON agent 403 may reduce a size of DELTA1. The reduction value of DELTA1 may be a preconfigured value.

The values of DELTA_TH1 and DELTA_TH2, which are threshold values to be compared with the sum of the numbers of times the max resource is increased may have the same value or different values. The increase value of a size of DELTA1 and the reduction value of a size of DELTA1 may have the same value or different values.

The SON agent 403 may correct the max resource reduction amount (e.g., DELTA2) as follows.

When the sum of the number of times the max resource is reduced during the predetermined time is greater than a preconfigured threshold value, for example, (number of times max resource is reduced for one day)>DELTA_TH1, the SON agent 403 may determine that the max resource changes too slowly. The SON agent 403 may increase a size of DELTA2. The reduction value of DELTA2 may be a preconfigured value.

When the sum of the number of times the max resource is reduced during the predetermined time is smaller than a preconfigured threshold value, for example, (number of times max resource is reduced for one day)<DELTA_TH2, the SON agent 403 may determine that the max resource changes too fast. The SON agent 403 may reduce a size of DELTA2. The reduction value of DELTA2 may be a preconfigured value.

The values of DELTA_TH1 and DELTA_TH2, which are threshold values to be compared with the sum of the numbers of times the max resource is reduced may have the same value or different values. The increase value of a size of DELTA2 and the reduction value of a size of DELTA2 may have the same value or different values.

For example, the max resource of network slice 1 may be changed by 10%. In this case, the max resource of network slice 1 may be changed from 10% to 20%, from 20% to 30%, from 30% to 40%, from 40% to 30%, from 30% to 20%, from 20% to 30%, from 30% to 40%, and from 40% to 30% for two hours. Here, there are two sections ({10%->20%, 20%->30%, 30%->40%}, {20%->30%, 30%->40%}) in which the max resource of the corresponding network slice is increased, and two sections ({40%->30%, 30%->20%}, {40%->30%}) in which the max resource is reduced, and thus increase/reduction repetition per hour corresponds to 1 time. If a threshold value for determining repeated increase/reduction is 1 per hour, the SON agent 403 may reduce a size of DELTA1 which is the increase amount of the max resource and a size of DELTA2 which is the reduction amount of the max resource by 5% each.

Alternatively, the max resource of network slice 2 may be changed from 10% to 20%, from 20% to 30%, from 30% to 40%, from 40% to 50%, from 50% to 60%, from 60% to 70%, from 70% to 80%, and from 80% to 90% for two hours. In this case, there are one section in which the max resource of network slice 2 is increased and thus the number of increases per hour corresponds to 0.5 times. If a threshold value for determining repeated increase/reduction is 1 per hour, the SON agent 403 may increase a size of DELTA1 which is the increase amount of the max resource.

In operation 430, the SON manager 402 may receive a request message include an adjustment request from the SON agent 403 of each cell as described above. In operation 440, the SON manager 402 may identify the followings regarding each network slice and determine a priority group to be included in each network slice.

The SON manager 402 may include, in priority group 2, a network slice in which a keep priority flag of a request is in an on-state. The network slice included in priority group 2 may correspond to a case in which UE_TPUT of the corresponding network slice is smaller compared to the throughput requirement, and the radio resource usage of the network slice is smaller than a threshold value of the maximum amount of allocable resources, and may be a network slice determined not to be able to satisfy the SLA even if the max resource is increased.

The SON manager 402 may include, in priority group 1, a network slice in which a keep priority flag of a request is in an off-state and there is at least one value smaller than zero in the adjustment request. The network slice included in priority group 1 may be a network slice that the SON agent 403 has failed to increase a resource.

The SON manager 402 may include, in priority group 3, a network slice in which a keep priority flag of a request is in an off-state and all adjustment requests have a value larger than zero. The network slice included in priority group 3 may be a network slice that the SON agent 403 has failed to reduce a resource.

The SON manager 402 may include, in priority group 4, a network slice in which a keep priority flag of a request is in an off-state and there is no value in adjustment requests. The network slice included in priority group 4 may be a network slice that the SON agent 403 has never failed to increase or reduce a resource.

In operation 450, the SON manager 402 may determine a priority of a network slice included in each priority group.

For example, the SON manager 402 may assign the highest priority with respect to a network slice in which the SON agent 403 has failed to increase a resource many times. The SON manager 402 may assign the next highest priority with respect to a network slice in which the SON agent 403 has failed to reduce a resource many times. The SON manager 402 may assign the lowest priority with respect to a network slice in which the SON agent 403 has all successfully adjusted resources.

According to an embodiment, the SON manager 402 may assign the highest priority to the network slices included in priority group 1. When two or more network slices are included in priority group 1, a higher priority may be assigned to a network slice having a smaller sum of values less than zero in the adjustment request.

The SON manager 402 may determine to maintain the previous priority of the network slices included in priority group 2. When the previous priority is preoccupied by priority group 1, the SON manager 402 may assign the nearest next lower priority. When two or more network slices are included in priority group 2, a higher priority may be assigned to a network slice having a smaller sum of values less than zero in the adjustment request.

The SON manager 402 may assign the highest priority to network slices included in priority group 3 except for the priorities assigned to priority group 1 and priority group 2. When two or more network slices are included in priority group 3, a higher priority may be assigned to a network slice having a greater throughput requirement.

The SON manager 402 may assign the highest priority to network slices included in priority group 4 except for the priorities assigned to priority group 1, priority group 2, and priority group 3. When two or more network slices are included in priority group 4, a higher priority may be assigned to a network slice having a greater sum of adjustment request.

In operation 460, the SON manager 402 may correct again the throughput requirement of the network slices to which a new priority has been assigned.

For example, when a throughput statistic of the terminal does not satisfy the throughput requirement, the SON manager 402 may adjust by reducing the throughput requirement of the corresponding network slice. In addition, when a throughput statistic of the terminal excessively satisfies the throughput requirement, the SON manager 402 may adjust by increasing the throughput requirement of the corresponding network slice.

According to an embodiment, the SON manager 402 may adjust a throughput requirement with respect to a network slice of priority group 1 as follows.

The SON manager 402 may maintain the throughput requirement if the new priority of the network slice is higher than the previous priority. That is, the throughput requirement of the corresponding network slice may be maintained as throughput requirement=throughput requirement.

When the new priority of the network slice is lower than or equal to the previous priority, the SON manager 402 may reduce a throughput requirement by a preconfigured value or by a preconfigured rate. For example, the throughput requirement of the corresponding network slice may be reduced to throughput requirement=throughput requirement*(1−DELTA3).

The SON manager 402 may reduce a throughput requirement with respect to a network slice of priority group 2 by a preconfigured value or preconfigured rate. For example, the throughput requirement of the corresponding network slice may be reduced to throughput requirement=throughput requirement*(1−DELTA3).

The SON manager 402 may maintain a throughput requirement with respect to a network slice of priority group 3. That is, the throughput requirement of the corresponding network slice may be maintained as throughput requirement=throughput requirement.

The SON manager 402 may adjust a throughput requirement with respect to a network slice of priority group 4 as follows.

The SON manager 402 may maintain the throughput requirement if the new priority of the network slice is lower than the previous one. That is, the throughput requirement of the corresponding network slice may be maintained as throughput requirement=throughput requirement.

When the new priority of the network slice is higher than or equal to the previous priority, the SON manager 402 may increase the throughput requirement by a preconfigured value or preconfigured rate. For example, the throughput requirement of the corresponding network slice may be increased to throughput requirement=throughput requirement*(1+DELTA3).

In operation 480, the SON manager 402 may transmit a message including information on a newly determined priority of each network slice and a throughput requirement to the cell (e.g., base station and SON agent 403) to which the corresponding network slice is included. Depending on an embodiment, the information may be configured to the Yang database of the cell to which the corresponding network slice is included.

According to the embodiments of the disclosure described above, there may be provided a method for efficiently using a radio resource while satisfying the SLA of a network slice by adjusting the radio resources to be appropriately and dynamically divided and used among multiple network slices sharing the radio resources through interaction between the SON manager and the SON agent.

Figure 5:
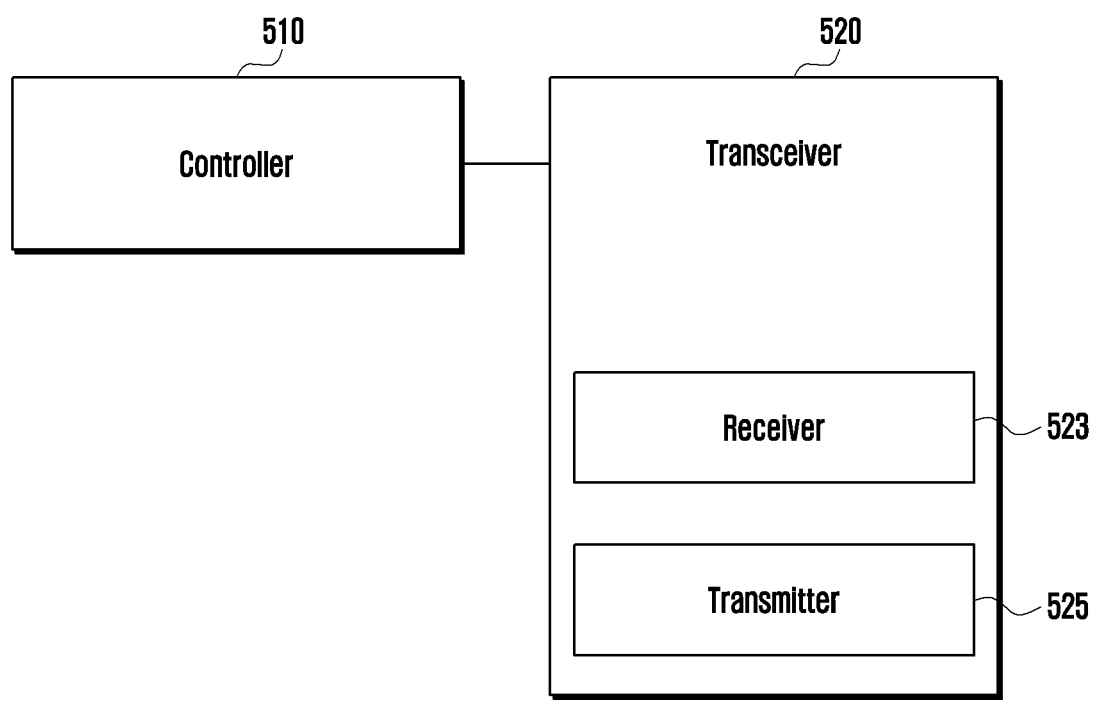
FIG. 5 is a view illustrating a configuration of a terminal according to an embodiment of the disclosure.

FIG. 5 is a view illustrating a configuration of a terminal according to an embodiment of the disclosure.

Referring to FIG. 5, the terminal according to an embodiment of the disclosure may include a transceiver 520 and a controller 510 configured to control overall operations of the terminal. The transceiver 520 may include a transmitter 525 and a receiver 523.

The transceiver 520 may transmit/receive a signal to/from other network entities.

The controller 510 may control the terminal to perform at least one operation among the above-described embodiments. The controller 510 and the transceiver 520 do not necessarily have to be implemented in separate modules and may implemented as a single unit such as a single chip. The controller 510 and the transceiver 520 may be electrically connected to each other. The controller 510 may be, for example, a circuit, an application-specific circuit, or at least one processor. In addition, operations of the terminal may be realized by including a memory device storing the corresponding program code in a predetermined component of the terminal.

Figure 6:
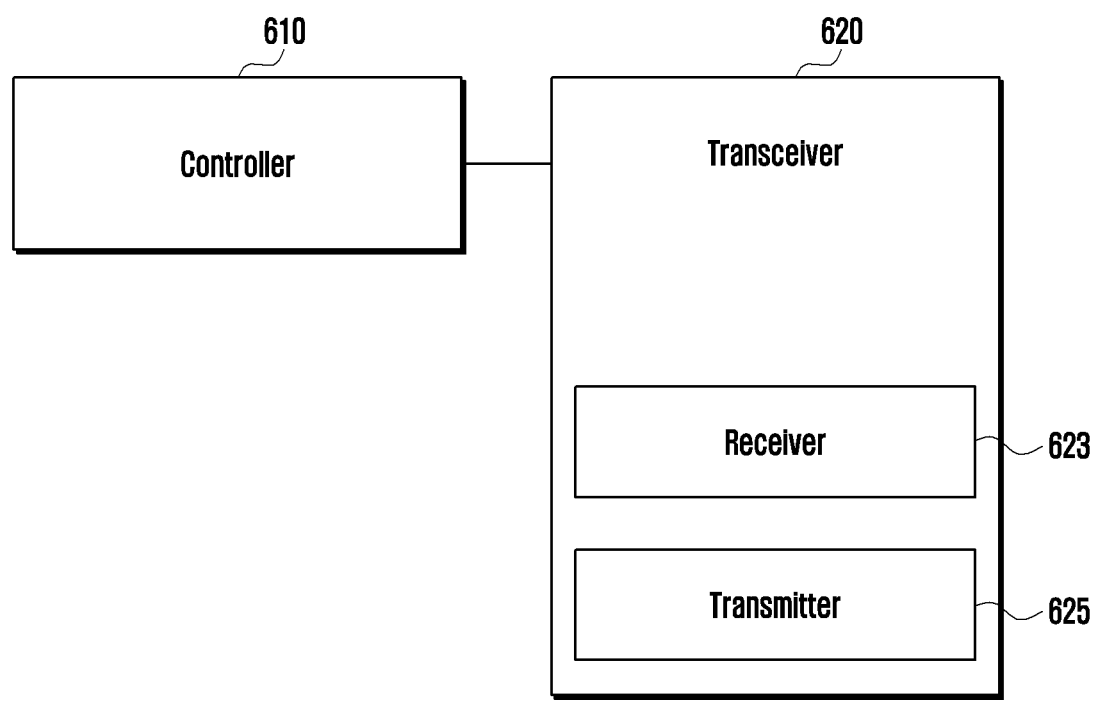
FIG. 6 is a view illustrating a configuration of a network entity according to an embodiment of the disclosure.

FIG. 6 is a view illustrating a configuration of a network entity according to an embodiment of the disclosure.

The network entity according to disclosure may include a network function according to system implementation.

Referring to FIG. 6, the network entity according to an embodiment of the disclosure may include a transceiver 620 and a controller 610 configured to control overall operations of the network entity. The transceiver 620 may include a transmitter 625 and a receiver 623.

The transceiver 620 may transmit/receive a signal to/from other network entities.

The controller 610 may control the network entity to perform at least one operation among the above-described embodiments. The controller 610 and the transceiver 620 do not necessarily have to be implemented in separate modules and may implemented as a single unit such as a single chip. The controller 610 and the transceiver 620 may be electrically connected to each other. The controller 610 may be, for example, a circuit, an application-specific circuit, or at least one processor. In addition, operations of the network entity may be realized by including a memory device storing the corresponding program code in a predetermined component of the network entity.

The network entity may correspond to one of a base station (e.g., an RAN, a next generation node B (gNB), and an SON agent), an SON manager, an operator, an AMF, an SMF, a UPF, a PCF, a UDM, and a UDR.

It should be noted that the configuration diagrams, the views of the control/data signal transmission method, and the view of the operation procedure illustrated in FIGS. 1 to 6 are not intended to limit the scope of the disclosure. That is, it should not be construed that all constituent units, entities, or operations shown in FIGS. 1 to 6 are essential elements for implementing the disclosure, and it should be understood that the disclosure may be implements by only some elements without departing from the basic scope of the disclosure.

The above-described operations of the network entity or the terminal may be realized by including a memory device storing the corresponding program code in a predetermined component of the network entity or the terminal. That is, the controller of the network entity or the terminal may execute the above-described operations by reading and executing the program code stored in the memory device by a processor or a central processing unit (CPU).

Various components, modules, etc., of the network entity, the base station, or the terminal described herein may also be operated using hardware circuits, for example, a complementary metal oxide semiconductor-based logic circuit, hardware circuits such as firmware, software, and/or a combination of the hardware and the firmware and/or software embedded in a machine-readable medium. For example, various electrical structures and methods may be performed using electrical circuits such as transistors, logic gates, and an application-specific integrated circuit.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a base station in a wireless communication system, the method comprising:
   receiving, from a self-organization network (SON) manager, a first message including a throughput requirement for a network slice among a plurality of network slices;
   determining a maximum ratio of an amount of resources for the network slice to an amount of total resources for the plurality of network slices based on a throughput of at least one terminal using the network slice and the throughput requirement for the network slice; and
   performing a communication with the at least one terminal using the network slice based on the maximum ratio.

2. The method of claim 1, wherein the determining of the maximum ratio comprises:
   determining whether the throughput of the at least one terminal using the network slice is less than the throughput requirement for the network slice;
   in case that the throughput of the at least one terminal using the network slice is less than the throughput requirement for the network slice, determining whether the maximum ratio is greater than or equal to a preconfigured maximum value;
   in case that the maximum ratio is less than the preconfigured maximum value, increasing the maximum ratio by a preconfigured value; and
   in case that the maximum ratio is greater than or equal to the preconfigured maximum value, maintaining the maximum ratio and adding a number of times the maximum ratio has been maintained to a request list for the network slice.

3. The method of claim 1, wherein the determining of the maximum ratio comprises:
   determining whether the throughput of the at least one terminal using the network slice is greater than the throughput requirement for the network slice;
   in case that the throughput of the at least one terminal using the network slice is greater than the throughput requirement for the network slice, determining whether maximum ratio is less than or equal to a preconfigured minimum value;
   in case that the maximum ratio is greater than the preconfigured minimum value, reducing the maximum ratio by a preconfigured value; and
   in case that the maximum ratio is less than or equal to the preconfigured minimum value, maintaining the maximum ratio and adding a number of times the maximum ratio has been maintained to a request list for the network slice.

4. The method of claim 1, wherein the determining of maximum ratio comprises:
   in case that a maximum ratio is less than or equal to a preconfigured minimum value, or the maximum ratio is greater than or equal to a preconfigured maximum value, maintaining the maximum ratio; and
   adding a number of times the maximum ratio has been maintained to a request list for the network slice.

5. The method of claim 1, further comprising:
   transmitting, to the SON manager, a second message including a request list for the network slice;
   receiving, from the SON manager, a third message including a priority value for the network slice, wherein the priority value is determined based on the request list; and
   determining the maximum ratio based on the priority value for the network slice.

6. The method of claim 1, further comprising:
   in case that a number of times the maximum ratio has been adjusted is greater than a first preconfigured value, increasing a preconfigured value; and
   in case that the number of times the maximum ratio has been adjusted is less than a second preconfigured value, reducing the preconfigured value.

7. A method performed by a self-organization network (SON) manager of a communication system, the method comprising:
receiving, from a service provider, information on a plurality of network slices;
based on the information on the plurality of network slices, determining a throughput requirement for a network slice among the plurality of network slices;
transmitting, to a base station, a first message including the throughput requirement for the network slice; and
receiving, from the base station, a second message a request list for the network slice, wherein the request list is determined based on the throughput requirement for the network slice and a throughput of at least one terminal using network slice.

8. The method of claim 7, further comprising:
configuring a priority for the network slice, based on the request list for the network slice; and
transmitting, to the base station, a third message including the priority for the network slice.

9. A base station of a communication system, the base station comprising:
a transceiver; and
a processor, including circuitry, coupled with the transceiver, wherein the processor is configured to:
receive, from a self-organization network (SON) manager, a first message including a throughput requirement for a network slice among a plurality of network slices,
determine a maximum ratio of an amount of resources for the network slice to an amount of total resources for the plurality of network slices based on a throughput of at least one terminal using the network slice and the throughput requirement for the network slice, and
perform a communication with the at least one terminal using the network slice based on the maximum ratio.

10. The base station of claim 9, wherein the processor is further configured to:
determine whether the throughput of the at least one terminal using the network slice is less than the throughput requirement for the network slice;
in case that the throughput of the at least one terminal for the network slice is less than the throughput requirement for the network slice, determine whether the maximum ratio is greater than or equal to a preconfigured maximum value;
in case that the maximum ratio is less than the preconfigured maximum value, increase the maximum ratio by a preconfigured value; and
in case that the maximum ratio is greater than or equal to the preconfigured maximum value, maintain the maximum ratio, and include a number of times the maximum ratio has been maintained in a request list for the network slice.

11. The base station of claim 9, wherein the processor is further configured to:
determine whether the throughput of the at least one terminal for the network slice is greater than the throughput requirement for the network slice;
in case that the throughput of the at least one terminal for the network slice is greater than the throughput requirement for the network slice, determine whether the maximum ratio is less than or equal to a preconfigured minimum value;
in case that the maximum ratio is greater than the preconfigured minimum value, reduce the maximum ratio by a preconfigured value;
in case that the maximum ratio is less than or equal to the preconfigured minimum value, maintain the maximum ratio for the network slice; and
add a number of times the maximum ratio has been maintained to a request list for the network slice.

12. The base station of claim 9, wherein the processor is further configured to:
in case that a maximum slice ratio is less than or equal to a preconfigured minimum value, or the maximum ratio is greater than or equal to a preconfigured maximum value, maintain the maximum ratio; and
add a number of times the maximum ratio has been maintained to a request list for the network slice.

13. The base station of claim 9, wherein the processor is further configured to:
transmit, to the SON manager, a second message including a request list for the network slice;
receive, from the SON manager, a third message including a priority value for the network slice, wherein the priority value is determined based on the request list; and
determine the maximum ratio based on the priority value for the network slice.

14. The base station of claim 9, wherein the processor is further configured to:
increase a preconfigured value in case that a number of times the maximum ratio has been adjusted is greater than a first preconfigured value; and
reduce the preconfigured value in case that the number of times the maximum ratio has been adjusted is less than a second preconfigured value.

15. A self-organization network (SON) manager of a communication system, the SON manager comprising:
a transceiver; and
a processor, including circuitry, coupled with transceiver, wherein the processor is configured to:
receive, from a service provider, information on a plurality of network slices,
based on the information on the plurality of network slices, determine a throughput requirement for a network slice among the plurality of network slices,
transmit, to a base station, a first message including the throughput requirement for the network slice, and
receive, from the base station, a second message a request list for the network slice, wherein the request list is determined based on the throughput requirement for the network slice and a throughput of at least one terminal using the network slice.

16. The SON manager of claim 15, wherein the processor is further configured to:
receive, from the base station, a second message including a request list for the network slice;
based on the information on the request list for the network slice, configure a priority for the network slice; and
transmit, to the base station, a third message including the priority for the network slice.

17. The SON manager of claim 15, wherein the processor is further configured to:
based on the information on the plurality of network slices, calculate an average value of distances between cells included in a cell list.

18. The SON manager of claim 17, wherein the processor is further configured to:
  based on the average value of distances between cells, determine an installation environment of the plurality of network slices, and
  based on the installation environment, determine the throughput requirement for the network slice.

19. The SON manager of claim 15, wherein the processor is further configured to:
  based on a throughput statistic of the at least one terminal not satisfying the throughput requirement, adjust by reducing the throughput requirement for the network slice, and
  based on the throughput statistic of the at least one terminal satisfying the throughput requirement, adjust by increasing the throughput requirement for the network slice.

* * * * *